United States Patent
Turner et al.

(10) Patent No.: US 8,515,654 B2
(45) Date of Patent: Aug. 20, 2013

(54) MOBILE DATA FLOW COLLECTION AND DISSEMINATION

(75) Inventors: James Benjamin Turner, Monroe, WA (US); Jonathan D. Canan, Bellevue, WA (US); Kalyan C. Uppalapati, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 12/235,602

(22) Filed: Sep. 23, 2008

(65) Prior Publication Data
US 2010/0076670 A1   Mar. 25, 2010

(51) Int. Cl.
| G06G 7/70 | (2006.01) |
| G06G 7/76 | (2006.01) |
| G08G 1/056 | (2006.01) |
| G08G 1/123 | (2006.01) |

(52) U.S. Cl.
USPC .......................................... 701/117; 455/571

(58) Field of Classification Search
USPC ................ 701/117, 484, 485, 537; 455/3.01, 455/3.05, 403, 414.1, 41.2, 571, 127.2; 340/933, 934, 935
See application file for complete search history.

(56) References Cited

U.S. PATENT DOCUMENTS

| 4,593,412 | A | * | 6/1986 | Jacob | 455/129 |
| 6,336,075 | B1 | * | 1/2002 | Park et al. | 701/211 |
| 6,813,561 | B2 | | 11/2004 | MacNeille et al. | |
| 6,816,452 | B1 | | 11/2004 | Maehata | |
| 7,046,168 | B2 | | 5/2006 | Tsuboi | |
| 7,133,767 | B2 | | 11/2006 | Ogino et al. | |
| 7,188,025 | B2 | * | 3/2007 | Hudson, Jr. | 701/117 |
| 7,352,743 | B2 | * | 4/2008 | Hameleers et al. | 370/389 |
| 7,430,218 | B2 | * | 9/2008 | Lee et al. | 370/464 |
| 7,908,660 | B2 | * | 3/2011 | Bahl | 726/25 |
| 2003/0125846 | A1 | | 7/2003 | Yu et al. | |
| 2004/0193372 | A1 | * | 9/2004 | MacNeille et al. | 701/213 |
| 2004/0209639 | A1 | * | 10/2004 | Kamperschroer et al. | 455/522 |
| 2004/0225740 | A1 | | 11/2004 | Klemba et al. | |
| 2004/0230370 | A1 | | 11/2004 | Tzamaloukas | |
| 2005/0002347 | A1 | | 1/2005 | Lee et al. | |
| 2006/0212194 | A1 | | 9/2006 | Breed | |
| 2007/0038772 | A1 | | 2/2007 | Obata | |
| 2007/0052527 | A1 | * | 3/2007 | Song et al. | 340/445 |
| 2008/0040023 | A1 | | 2/2008 | Breed et al. | |
| 2008/0059050 | A1 | | 3/2008 | Lin et al. | |
| 2008/0088480 | A1 | | 4/2008 | Rozum et al. | |

OTHER PUBLICATIONS

"International Search Report", Mailed May 11, 2010, Application No. PCT/US2009/058115, Filed Date Sep. 23, 2009, pp. 1-11.

(Continued)

*Primary Examiner* — Mark Beauchaine
(74) *Attorney, Agent, or Firm* — Gonzalez Saggio & Harlan LLP (57) ABSTRACT

Described is a technology in which Bluetooth® devices, e.g., navigation devices, are enhanced with additional power amplification to allow long range radio communication links between moving vehicles and/or between moving vehicles and roadside hubs. In one example, collection and dissemination of traffic information, including aggregation and filtering, is facilitated via a Bluetooth® vehicle-to-vehicle and/or vehicle-to-roadside hub ad-hoc network. Also described is efficient connection establishment and data transfer for vehicle to vehicle and vehicle-to-roadside hubs via the enhanced Bluetooth® radio. The ad-hoc network comprising a mesh of vehicles/a supernode also facilitates the exchange of information that originated at an Internet source.

20 Claims, 7 Drawing Sheets

(56) References Cited

OTHER PUBLICATIONS

Chigan, et al., "A Delay-Bounded Dynamic Interactive Power Control Algorithm for VANETs", Retrieved at << http://www.ece.mtu.edu/ee/faculty/cchigan/Chigan-ICC-DelayBoundVANET.pdf >>, IEEE International Conference on Communications, Jun. 28, 2007, pp. 5849-5855.

"DaimlerChrysler Tests WLAN Car-to-Car Communication System", (Retrieved May 21, 2008) Webpage Available at: http://jalopnik.com/cars/gadgets/daimlerchrysler-tests-wlan-car+to+car-communication-system-219722.php.

Nadeem, et al., "TrafficView: Traffic Data Dissemination using Car-to-Car Communication", In ACM Mobile Computing and Communications Review (MC2R), Special Issue on Mobile Data Management, vol. 8, No. 3, Jul. 2004, pp. 6-19.

Hui, Fay, "Experimental Characterization of Communications in Vehicular Ad Hoc Network", Thesis Submitted in for the degree of Master of Science in Computer Science in the Office of Graduate Studies of the University of California, Dated: 2005, 49 Pages.

Sawant, et al., "Using Bluetooth and Sensor Networks for Intelligent Transportation Systems", IEEE Intelligent Transportation Systems Conference, Washington, D.C., USA, 2004, Dated: Oct. 3-6, 2004, pp. 767-772.

\* cited by examiner

MOBILE DATA FLOW COLLECTION AND DISSEMINATION

BACKGROUND

Many drivers utilize portable or in-dash navigation devices that provide directions and traffic flow information. Drivers use such devices to look for any current traffic problems and sometimes for advice on how to avoid congestion.

However, the road coverage of publicly available traffic flow information is severely limited, and only relatively few companies provide commercially viable traffic flow information. Fixed road sensors are expensive to deploy and maintain, and therefore are not a cost-effective solution for expanding the road coverage of available traffic flow information to other areas.

The notion of using moving fleet vehicles as "probe sensors" to collect traffic information has been explored, but today this type of information is proprietary and still far too limited in volume to accurately generate traffic flow information. For one, fleet vehicles alone do not present enough data points to accurately generate and represent traffic conditions. Further, fleet vehicles do not necessarily match the driving patterns of consumer vehicles.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which data is transmitted from a Bluetooth® device (or other short range radio device, such as using unlicensed frequencies) in a mobile vehicle to an external receiver that is not physically connected to the mobile vehicle, including by boosting transmission power of the device to increase the device's transmission range. For example, the transmission power may be amplified to the maximum transmission power (or substantially close to the maximum transmission power) that is allowed by governmental regulations.

In one implementation, the transmitted data corresponds to information by which traffic conditions may be estimated, such as location, speed, and bearing data of the vehicle. By transmitting such data and receiving similar data from other vehicles and/or roadside hubs, an accurate estimate may be made.

The various cars and/or roadside hubs form a mesh for exchanging information. Additional information such as data originating from an Internet source may be communicated among the nodes of the mesh. A supernode may act as a gateway to the Internet for other nodes able to connect to it, either directly or indirectly in the mesh; one example of a supernode may be a vehicle that is connected to the mesh but also has Internet connectivity, either through cellular, WiMAX or some other wide area network connection.

In one example implementation, efficient communication is facilitated by placing at least part of the exchanged data in a communication corresponding to a Bluetooth® discovery process. For example, traffic data may be placed in unused bytes of the discovery communication, whereby the data is automatically exchanged as Bluetooth® devices initially discover the existence of one another.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using Bluetooth® integrated circuits, including with additional power amplification, to allow long range radio communication links between two (or more) moving cars and/or between moving cars and roadside hubs. Among other benefits, the enhanced Bluetooth® radio provides efficient connection establishment and data transfer for car-to-car radio connections and/or for car-to-hub radio connections.

As will be understood, the technology enables mechanisms for the dissemination of traffic information or other types of information across a Bluetooth® vehicle-to-vehicle ad-hoc network, including node-level filtering and aggregation of data. With respect to traffic, the technology described herein utilizes any available vehicles (including consumer vehicles, rather than only fleet vehicles) by enabling car-to-car, car-to-hub, and car-to-internet communication via a Bluetooth® mesh network. Note that far more consumer vehicles can be equipped with the necessary components to support traffic collection than the number of fleet vehicles that will ever exist, and that consumer vehicles will by nature represent the driving patterns of the general public. By the ad-hoc network, traffic can be fused and disseminated with minimal to no connectivity to the Internet, which will reduce or even eliminate the costs of data connectivity. Notwithstanding, the technology facilitates the connection of any node in the Bluetooth® vehicle-to-vehicle network to the Internet via a roadside hub or a two-way connected supernode as described herein; car based access to the internet may be entirely independent of the user's phone.

While some of the examples described herein are directed towards exchanging traffic-related data by leveraging personal or in-dash navigation devices in cars, these are only examples. Any usage of radio communication between any types of devices in moving vehicles (including cars) and/or roadside hubs to exchange information may benefit from the technology described herein. Non-traffic examples include advertising, improved Internet access, voice, text and/or graphics communications, and so forth.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in mobile computing and mobile communications in general.

Figure 1:
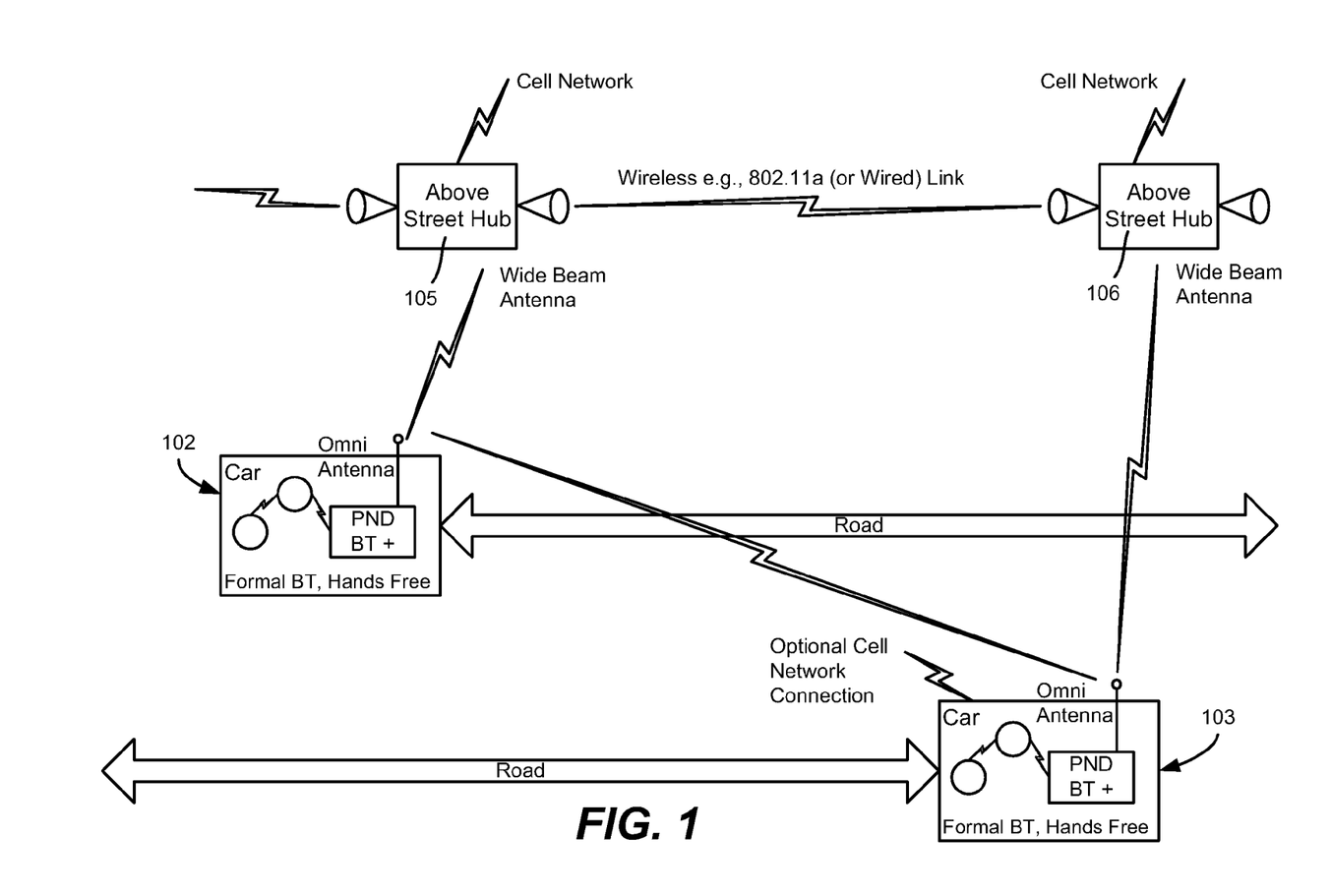
FIG. 1 is a representation of an example environment and system for wireless mobile communication, including by enhanced Bluetooth® communication.

Turning to FIG. 1, there is shown a general block diagram representing an example mobile data flow collection and dissemination system in a traffic flow environment. In this system, RF links may exist between cars (e.g., 102 and 103) and from the cars 102, 103 to roadside hubs 105, 106. In one implementation, traffic flow (and/or other) information is shared between cars. Optionally the information may be shared with various services via Internet connections, forming a mesh of car nodes; the Bluetooth® links among cars form a mesh and/or may be used to create a supernode. The Internet connection may be from a roadside hub e.g., 105) or to/from a car with a cellular network connection.

Figure 2:
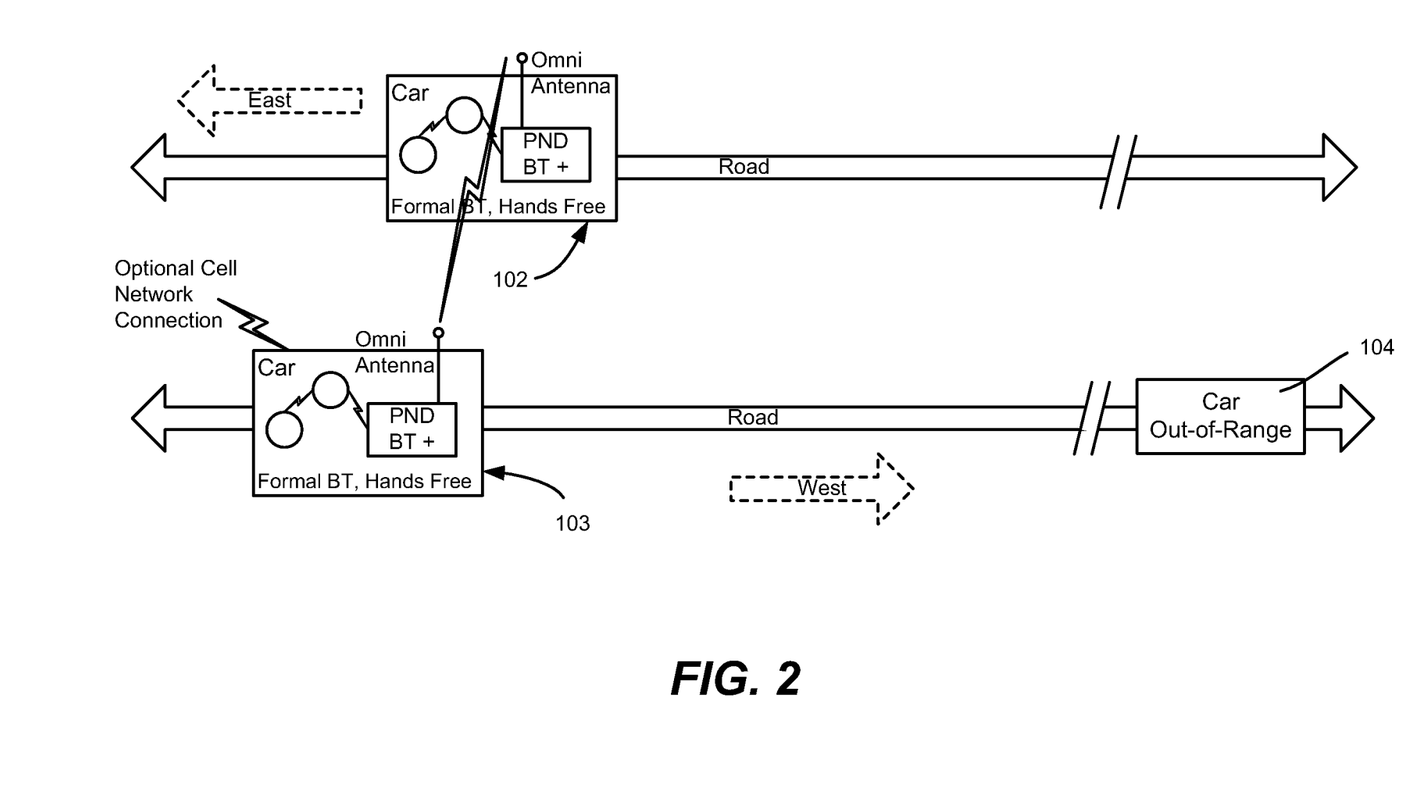
FIG. 2 is a representation of an example environment and system for car-to-car wireless mobile communication, including by enhanced Bluetooth® communication.

By way of example of traffic communication, in FIG. 2, one eastbound car 102 may have previously received traffic information from another westbound car 104. Even though the westbound car 104 may now be out-of-range with the car 102, and is not in range with the car 103, the car 102 can relay car 104's traffic information to the car 103. The information may be used, alone or in combination with other traffic data, such as to notify the car 103 that it will soon be coming to congested traffic.

The car to car link range is about 0.8 kilometers when line of sight is available. When the cars are past each other, the range is lower. For example, consider two cars at 60 mph connected for 1.2 km; at a data rate of 115 kbps, 318 kilobytes of data can be communicated over one continuous link, not considering synchronization and overhead, which will reduce this.

As generally represented in FIGS. 1 and 2, the cars' communication antennas need to be fairly omni-directional because each car may be at various angles relative to other cars and/or roadside hubs 105, 106. Also there are situations in which the line of sight is blocked, but a different reflect path exists that provides sufficient RF energy to complete the link.

As described herein, each car in the mesh of car nodes may calculate traffic conditions and then retransmit the conditions to other participating car nodes. If the mesh is low density, the cars may transmit individual location, speed and bearing information to a hub (e.g., 105), which then forwards this information to remote servers for traffic flow calculation and aggregation, to another hub (e.g., 106), and/or back to other vehicles as they pass within connection range of the hub.

Each hub's antenna may have some small gain (e.g., fifteen dB) but needs to have full vision of the highway, whereby the beam width needs to be relatively wide (e.g., thirty degrees). To help overcome RF fades, the hub e.g., 105) may have two antennas for diversity. Also using small packet sizes allows packets to be received between deep fades. Such short packets also help in inter-symbol interference loss. Block coding may be used to help overcome single bit failures.

Figure 5:
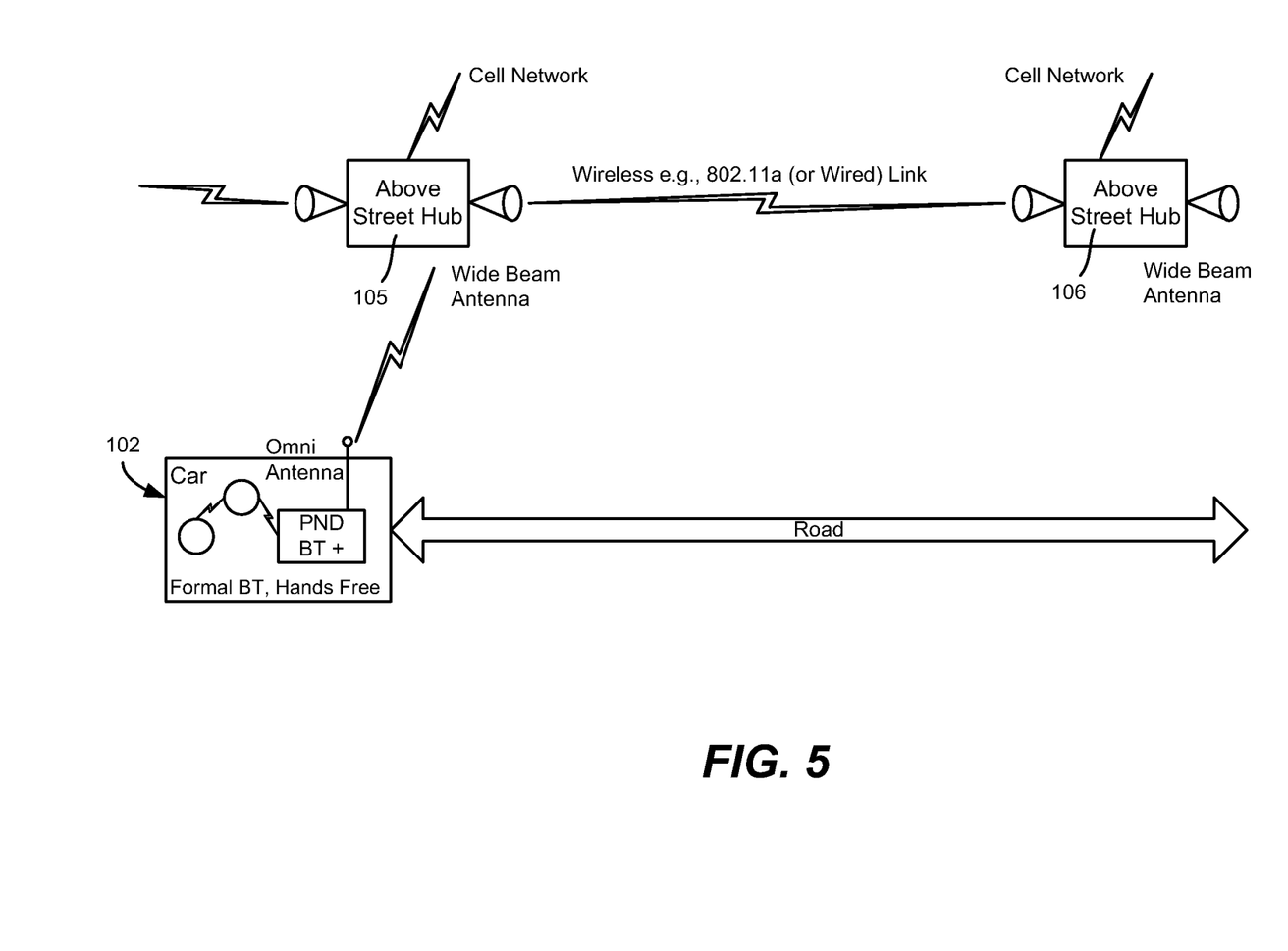
FIG. 5 is a representation of an example environment and system for car-to-roadside hub wireless mobile communication, including by enhanced Bluetooth® communication.

In one implementation, the RF link is accomplished via Bluetooth®-based technology and frequencies. As can be readily appreciated, many personal or in-dash navigation and other personal devices are Bluetooth®-enabled; by boosting the power of such devices via additional circuitry and/or adding a amplifier to a vehicle for boosting transmission from an existing device, longer range Bluetooth® communication is achieved. In FIGS. 1, 2 and 5, the personal or in-dash navigation device with enhanced power capability (relative to recommended Bluetooth®-enabled devices) is represented in each car node by the blocks labeled PND BT+, and is also referred to herein as a car unit.

In an implementation in which the data that is communicated is traffic-related data, the data rate over the wireless interface does not have to be large. More particularly, consider the data sequence from a GPS receiver shown below:

$GPRMC,031751.000,A,4737.8614,N,12211.3113,W, 46.50,187.27,280706, , , D*4 2

Of this data, only position, speed, and bearing data are needed for traffic-related communication, although time may be provided to prevent the usage of stale data. The bearing allows confirmation of the direction of travel of the car. In one example:

Time=HHMMSS.XXX=031751.000, where XXX represents the milliseconds, which may be excluded.

Latitude=HHMM.M=4737.8614,N; (the comma may be excluded).

Longitude=HHHMM.M=12211.3113,W; (the comma may be excluded).

Speed=XX.XX=46.50 in knots; (1 knot=1.1507794 miles per hour).

Bearing=XXX.XX=187.27 degrees azimuth; 0 represents north, 90 represents east.

To get time, position, speed, and bearing information in this format, forty-two bytes for each record are needed. If five records are stored and transmitted in this format when the hub is connected to the personal or in-dash navigation device (PND), then 210 bytes of payload are needed. As can be readily appreciated, this is only a relatively small amount of data.

To further reduce the amount of data transmission, TMC (Traffic Message Channel) location codes and speed value compression may be used. TMC is an international standard for identifying road segments within a map database such as those used by GPS navigation systems. A globally unique TMC location code is only 27 bits, and is comprised of:

Location Code: 16 bits
Location Table Number: 6 bits
Country Code: 4 bits
Direction: 1 bit Further, because location table number and country code are generally constant within any given region, these need not be transmitted very often. However, even if transmitted with every record, the information needed can be transmitted within approximately four bytes per record (assuming speed is rounded into five mph buckets), rather than forty-two bytes per record in the uncompressed format.

In one example, the stored records are at 0.1 mile increments, or in case of slow traffic, every two minutes. Any increment may be used, as long as it allows fresh traffic data at reasonable road distance resolution. Most navigation devices only display and route at a TMC segment granularity. TMC segments range in length, and generally are broken down such that they do not span decision points (e.g. on-ramps or off-ramps). In cities a segment may correspond to a quarter mile, while in rural areas a segment may correspond to ten miles.

Turning to aspects of the radio link, various radio systems may be used between cars and between cars and hubs. In one implementation, Bluetooth® is used, as amplified as described above for higher-power operation. More particularly, to over-come range-related issues with relatively short range Bluetooth® radios, the power output may be increased to the maximum power (or substantially close to a maximum transmission power) allowed by governmental regulations. In the United States, this is one watt as allowed by FCC regulations. When the personal or in-dash navigation device is not accessing the data link, the device may act as a "normal" Bluetooth® class 1 device. Note that adding a low-noise amplifier increases sensitivity. Adding a power amplifier and low-noise amplifier increases power consumption, but the car's electrical power system is generally used to power such a navigation device, eliminating power consumption concerns. Note that based on GPS data, two devices may recognize that they are close enough to communicate with a lesser amount of power.

In general, Bluetooth® technology provides for an inquiry session/discovery process for pairing devices, which allows for a Bluetooth®-enabled device to let other devices discover it, and also for the device to discover other devices. At present, much of the pairing communication payload (240 bytes) is unused. In one alternative, the traffic data, which as described above may be as little as 27 bits, may be placed in the unused pairing payload, along with identifier information and/or small messages, for example. The use of such unused pairing payload is essentially free, and is extremely rapid and efficient; no additional information needs to be exchanged following the pairing communication to have a functional traffic data exchange system. Further, although at times the power may be one watt, the low duty cycle resulting from such rapid pairing communication corresponds to low average power consumption.

Figure 3:
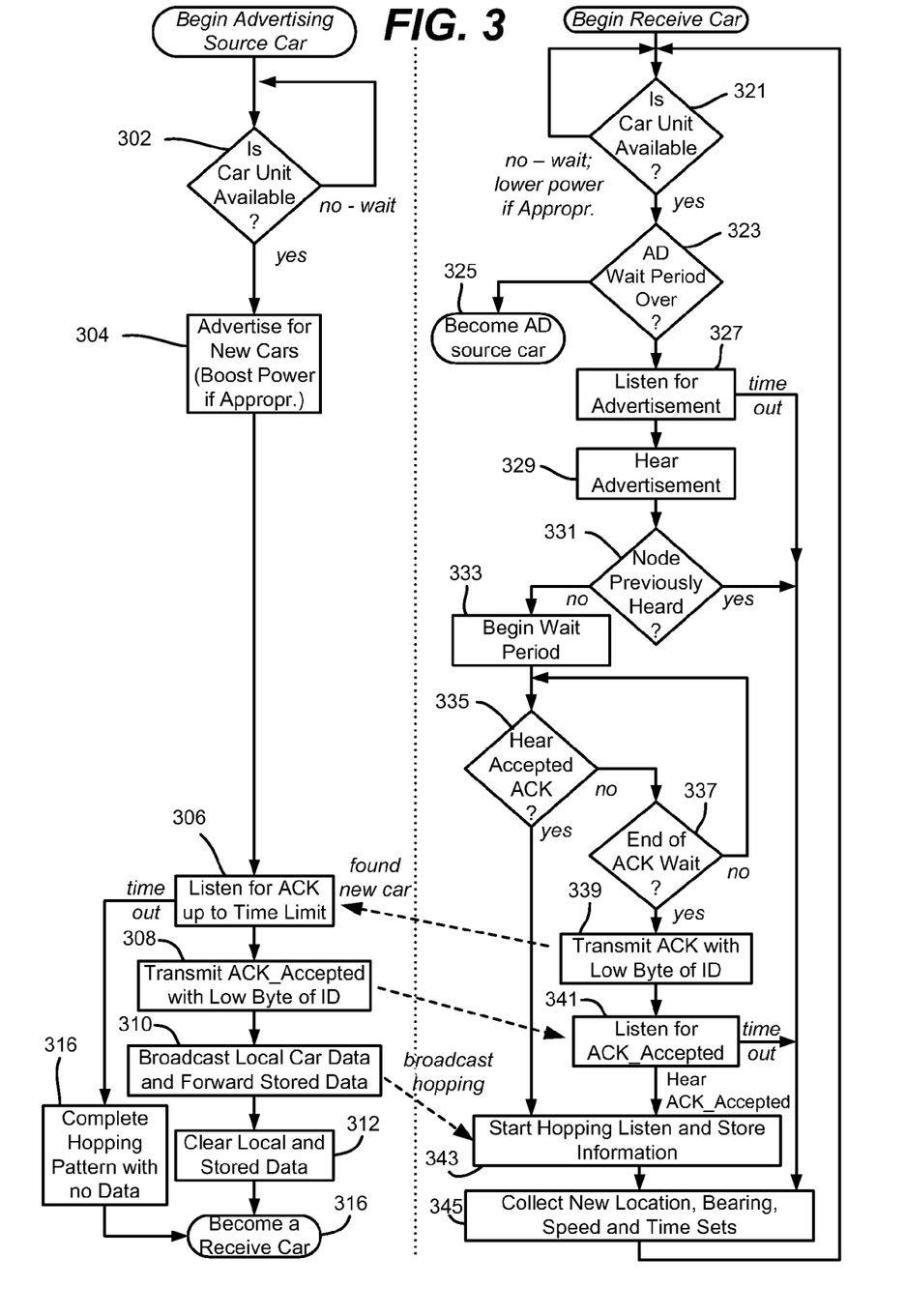
FIG. 3 is a flow diagram showing example steps that may be taken to accomplish car-to-car wireless mobile communication.

Turning to an explanation of example logic of the access and connection between cars, as generally represented in FIG. 3, each car has the ability to advertise an invitation for other cars to listen. In one implementation, when the source car's navigational device (or "car unit") is available, such "AD" messages are sent out in a broadcast mode with best effort, as generally represented via step 304; there is no acknowledgement of proper receipt of data. Transmission power may be increased as appropriate, e.g., if not already boosted. The advertisement does have an acknowledgement (ACK) to allow the propagation of messages thought the network. A fixed frequency may be used for advertisement throughout the whole network.

Once a car has advertised, it waits a time period that is based on its identifier (ID, which is unique within the system), e.g., the lowest byte of the car node's ID times an AD_WAIT_TIME before sending a new advertisement. Once the advertisement is made, the cars that are near enough to be in range are available to acknowledge. To prevent contention, each car waits for a time based on their ID, e.g., of ACK_WAIT_TIME*low byte of ID. In general, the ACK_WAIT_TIME is much smaller than the AD_WAIT_TIME.

When the advertising node hears the acknowledgement (step 306), it transmits an ACK_ACCEPTED message (step 308) and starts its hopping pattern at a correct time. This hopping pattern is unique to the node that sent the advertisement. The hopping pattern is part of the advertisement message, and the starting time of the hopping is part of the ACK_ACCEPTED message.

Step 310 broadcasts the local (source) car's current data, as well as any stored data, e.g., received from other cars. Step 312 clears the data. At step 316, the car transitions to become a receive car.

For completeness, step 314 shows completing hopping upon timing out without an acknowledgement within the time limit, e.g., 256 times the ACK_WAIT_TIME. More particularly, if a node sends an advertisement message but gets no ACK before the timeout time, then the source node quickly steps through its hopping pattern even though there are no intended listeners. This allows a node to comply with the FCC hopping requirement rather than just making advertisements on the same frequency over and over.

As generally represented in the receive portion of FIG. 3, each of the other car nodes is listening for transactions while waiting for its turn to ACK. Once such a node hears the ACK_ACCEPTED message (step 341), then at step 343 it transitions into the hopping pattern sent in the advertisement. If a car moves out of range and does not hear the ACK_ACCEPTED message, then the car attempts to ACK, but get no response.

By way of example, while waiting for its next turn to advertise, a car node 102 listens for advertisements on the common AD frequency, as generally represented by step 329. If the node 102 hears an AD from the node 103 (step 329), then there is a decision on whether to ACK or not. To this end, if at step 331 the node 102 has received broadcast data from the node 103 since the last time the node 102 advertised, then the node 102 ignores the node 103 and waits for another advertisement.

If the node 102 instead does not recognize the node 103 as a "recent" broadcast, then after waiting via steps 333 and 337 (e.g., ID Low Byte times the ACK_WAIT_TIME) and not hearing another accepted ACK (step 335), the node 102 is allowed to ACK and listen to the node 103. If the ACK is accepted, step 343 represents starting the hopping listen and storing of the received information.

Step 345 represents the node updating its location, bearing, speed and current time. Eventually, the node will reach its advertisement wait time at step 323 (e.g., ID Low Byte times the AD_WAIT_TIME) and become a source car (Step 325). Note that once the node 102 has become an advertiser, the history of IDs of received broadcasts is removed.

Figure 4A:
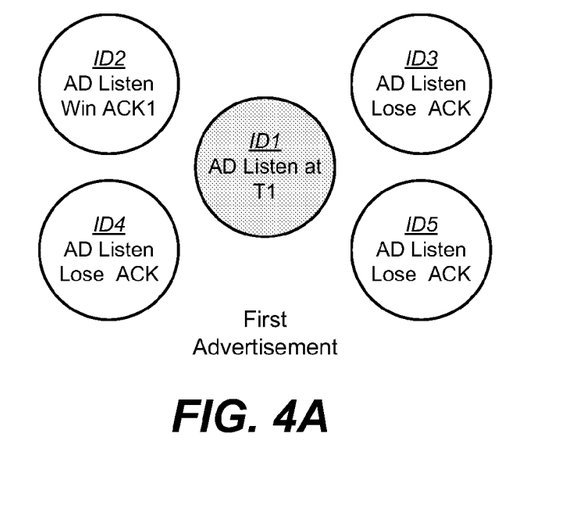
FIGS. 4A-4C are representations of data being disseminated among cars along with listening and other states of the cars.
Figure 4B:
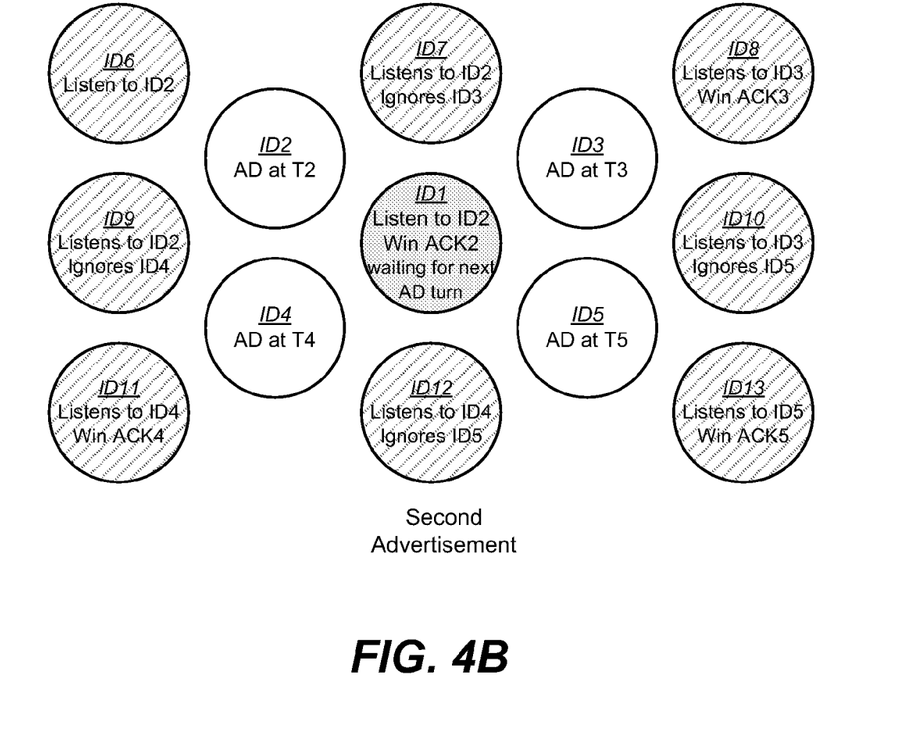
Figure 4C:
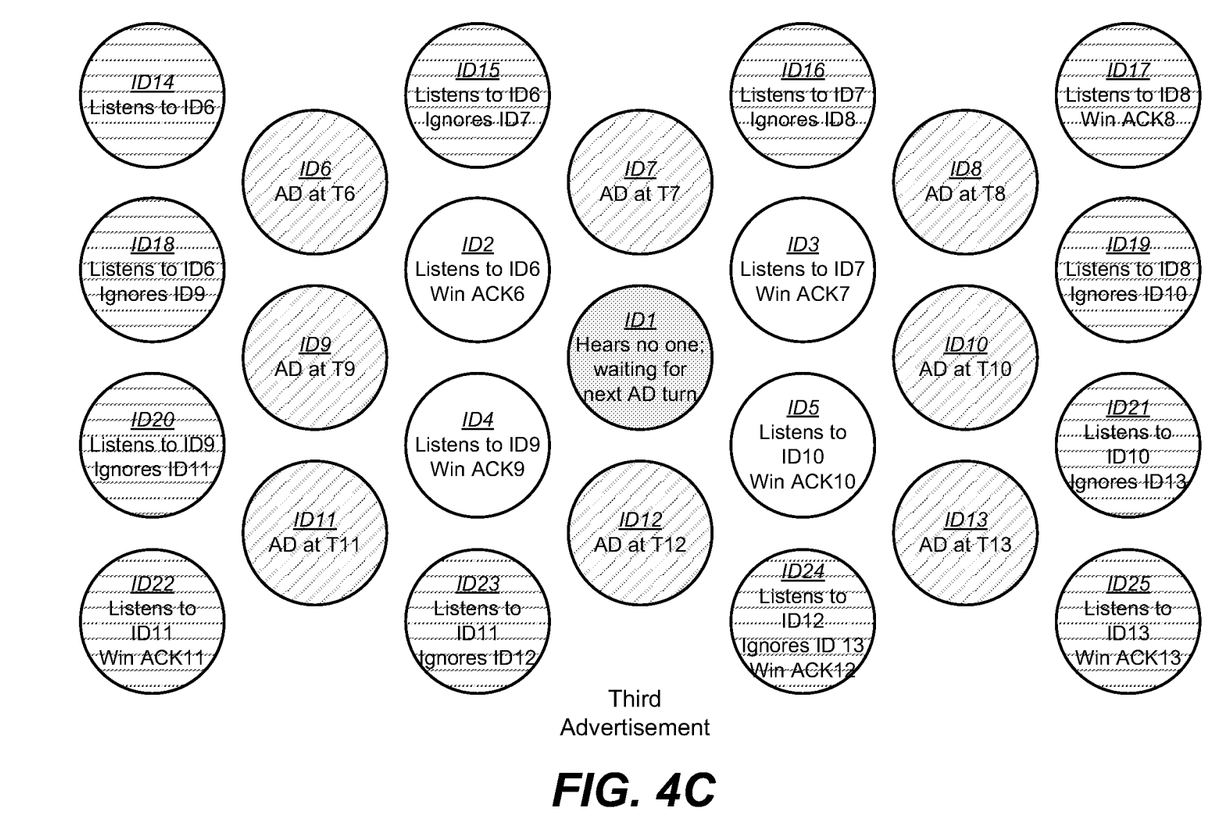

FIGS. 4A-4C summarize an example of how advertisements are spread from car to car. As can be seen in this example, the lowest ID has the least time to wait and thus wins the acknowledgment, however other nodes listen to the advertisements.

Turning to an example of the RF link system for a car to a roadside hub as generally represented in FIG. 5, one of the usages of communication is the reliable collection of traffic flow data. In general, the car (e.g., 102) and hub units (e.g., 105 and 106) have RF output power of one watt. The car unit antenna is omni-directional to allow variable directions of link path. The antenna gain of the hub unit may be about 3 dB for the car RF link. This is because there is a smaller field of view needed for the hub as compared to the car that is moving.

Figure 6:
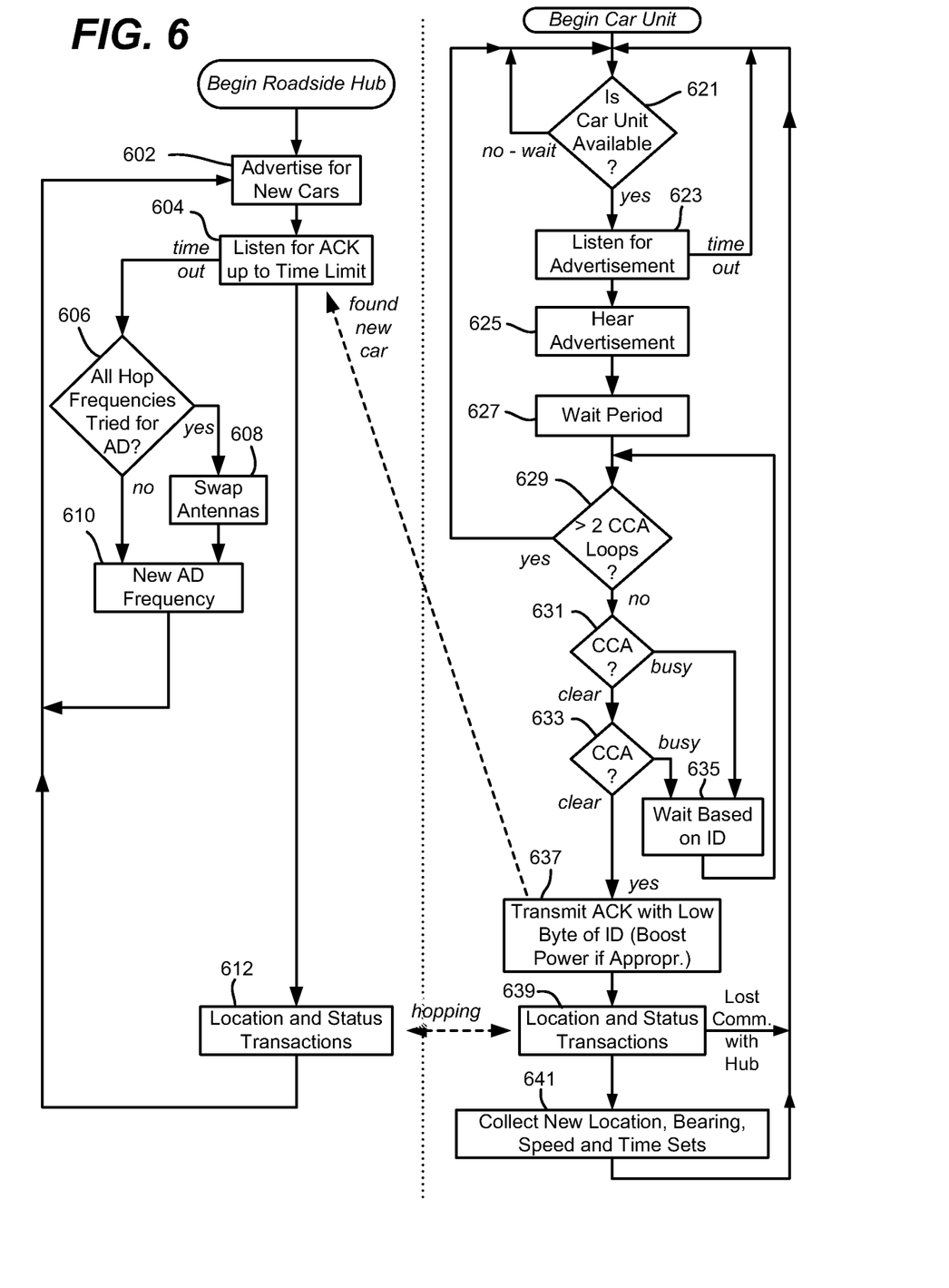
FIG. 6 is a flow diagram showing example steps that may be taken to accomplish car-to-roadside hub wireless mobile communication.

Example steps for the establishment of a car to roadside hub air link are shown in FIG. 6. Note that the car's unit collects a number of sets of traffic flow information sets, as set by a system designer. For example, the car unit may collect five sets of traffic information at one second intervals or one mile intervals. The car unit is then ready to connect to the roadside unit.

To reduce contention in the air link, at step 602 the roadside hub initiates the connection (advertises a connection) while car units are listening. The roadside unit advertises with hopping frequencies. In one implementation, at each hop, a full advertisement packet is transmitted, which includes the hub ID and the hopping pattern to be used during the active connection As generally represented by step 604, once the roadside hub finishes the advertisement, it waits for a car unit to respond. If a car responds, the hub transmits location and status transactions to the responding car unit.

If no car responds, the hub times out and reissues the advertisement at a new hop frequency at step 610. For example, the hub may waits for 26 ms for a response from any car unit. This time limit can be changed, but is greater than 255 times the car wait period (described below). In a worst case, the hub has to advertise on all 75 hop frequencies before finding a car response; in the example herein, the maximum time to find a car is 75*26 ms=1.9 seconds; the mean time is from 0.4 to 0.95 seconds for connection wait. This maximum time is still less than five percent of the hub-to-car visible time period for a line of sight connection.

In the event that the entire hopping pattern has been covered, the roadside hub swaps to a different antenna via steps 606 and 608. This allows antenna diversity in the event that the cars are stopped or at a very slow speed, which may cause almost static fading conditions.

From the car unit side, the car unit (e.g., its software) enters the communication mode on a given duty cycle or continuously when not in a "normal" Bluetooth connection (step 621). A task for the car unit is to listen for an advertisement to connect to a hub, as generally represented by step 623; the car unit listens at a fixed frequency. This fixed frequency is set by the ID of car units. The lowest byte is truncated to decimal 75 and used to pick the hop frequency used to listen for advertisement. Having a somewhat random set of car unit start frequencies allows a systems configuration option that may lead to improved channel utilization by reducing the number of advertisement hops the hub makes before contacting a car. If at step 623 no hub is heard within a specified time, the car unit times out and goes back to normal Bluetooth® operation waiting for the next time the unit is available.

Once the car unit hears the hubs advertisement (step 625) it waits at step 627 for a period set by its ID. In the examples of FIGS. 5 and 6 the wait time is the lowest byte of the ID times 100 microseconds. Although this does not enforce unique back-off times over millions of units, the chance that units with exactly the same last byte of ID being within range of the roadside hub at the same time is relatively very low.

After waiting for the computed time, via steps 629, 631 and 633 the car unit checks for clear channel (CCA) twice. If the channel is busy then a short interval is inserted (e.g., ID low byte*10 microseconds) at step 635 and the channel is assessed again. The channel assessment is done in two loops to allow the car unit to respond even if a short duration noise burst happens. If the channel is busy for two CCA loops, then the car unit assumes that someone else is using the channel, listens to the hopping pattern long enough to recognize it, and keeps checking for CCA; a local counter tracks the hopping pattern. Once the channel is clear the car unit returns to listen for an advertisement on the frequency next in sequence with the previously-heard hopping pattern If the channel is found clear, then the car unit transmits an acknowledgement packet which includes its full ID, as generally represented via step 637; transmission power may be increased as appropriate, e.g., if not already boosted. When a roadside hub and a car unit are in active communication, the traffic flow information is exchanged along with block coding (step 639). The link continues to communicate to reliably send each set of traffic flow information. The oldest information has priority and communication is repeated until each set is received by the hub, with acknowledgment. After the data is exchanged, step 641 represents updating current information for a next communication.

If car-to-hub connections are desired for more data than just traffic flow, then the exchange can be extended. A maximum exchange size can be set to allow fair access to the network by other cars. Once a car has been connected to a hub, then the hub has the option of telling the car unit to not respond to an advertisement from this hub for N times of advertisement. This allows fair access to the roadside hub for network connections and the hub can balance the air link data depending on how many cars are within range.

When the car hears the next advertisement, preference is given to cars that have not been connected to that hub recently. In this example, recently is determined by system configuration, but is normally meant to be about five minutes. If the hub was known from previous recent communications then in one implementation, the car decrements a counter and listens to hopping to get the next advertisement. This counter is initialized as the lowest four bits of the car unit's unique ID. As a result, in situations where traffic is very slow, a car can connect more than once to a hub but only after allowing other nodes to respond to the advertisement. After waiting a time that is set as "recent," the flag that indicates a known hub is reset. This allows access to the hub later on in the day or on a different day with no waiting.

Once the communications are completed for the present link, the hub prepares for the next advertisement by setting its frequency to the next frequency in the hopping sequence used in previous link. This initialization allows cars that have not been connected but are watching the active communication to set their initial listen frequency to match the next advertisement frequency. Reception of an advertisement happens at the first try for situations where a car was within range but was not the first to previously connect.

As described above, an alternative to the various methods to access the RF links uses existing Bluetooth® inquiry sessions as data handling. Normal Bluetooth® v2.1 specification inquiry allows an extended data section of the response to inquiry. By receiving the extended section of the inquiry response but not establishing a pico-net, the small sized traffic information packets can be quickly spread throughout the car mesh without the longer time overhead of full pairing. Such a method allows quick connect and release of car nodes and propagates the traffic flow information. Although not a broadcast method, the nodes still inquire often enough to spread the information effectively.

Note that in the normal Bluetooth® pairing process, a master will inquire for the devices in its vicinity and the slave devices will respond. Then the master will initiate the pairing process with the slave. Once the connection is established, master will inquire about the services offered by the slave and connects to a particular service. The data is exchanged only after complete connection establishment. If the goal is just to exchange the traffic information, then this process is redundant.

As a result, when the master inquires of the slave devices, each slave will respond with extended information about itself. The length of the response is 240 bytes. Even if the length of the actual information is 'n' bytes, the remaining (240−n) bytes need to be filled with zeroes. These otherwise-zeroed spaces can be used to contain the traffic information. An advantage of this method is that connection establishment between cars or between car and roadside hubs can be completely eliminated and nodes can collect information from multiple neighbors simultaneously.

To prevent collisions between cars acting as slaves, the unit will only go into a "discoverable" mode at a time set by the ID lower byte time a predetermined scalar. For instance is the lower byte of an ID is 0x05, and the scalar is 10 ms, then this unit will act as a discoverable slave after 50 ms wait time. Once finding an inquirer, then the unit waits for greater than 255*scalar to allow other units to respond to an inquiry. If a car is acting as the master doing the inquiry and it does not get a response after 256*scalar, then it waits 1*scalar and becomes a slave in discovery mode. In this way cars can be masters throughout the mesh, or cars can be a master and send information to a roadside hub.

Optional connections between roadside hubs are not required but can be helpful. To help coordinate traffic flow collection hubs can indicate that car units of a certain ID are coming into the next hub coverage. This helps reduce the advertise time and acceptance time. The hub can alter normal advertising hopping to start at the initial frequency of the car that is predicted to enter its range as long as the general pseudo-random pattern of hopping is maintained.

Also, a hub-to-hub link can collect traffic flow information until a predetermined hub can transmit all the data from various hubs to an internet service via a wide area connection. The connection from the roadside hub or a supernode in the network a node with Internet access to the internet can be through any WAN system that is available and cost effective. Cell phone or WiMax are possibilities but meshed 802.11 networks (when available) are also feasible. If hard wired communication is available at the roadside unit a modem can be used, although many physical locations for hubs may preclude telephone network wiring.

Additional enhancements may be provided by exchanging additional data over the Bluetooth® links. For example, data received over one car's cellular network connection (e.g., the car 103 in FIG. 1) can be provided to another car.

Further, other communication-related data may be relayed among vehicles and/or roadside hubs, such as in anticipation of reaching a hub. For example, consider a system in which a hub is also capable of wireless WLAN communication with cars. Via the Bluetooth® link, one car can tell another car what WLAN channel that upcoming hub is using so that the other car can be prepared to quickly and efficiently communicate when it comes within range of that hub. Other information such as credentials, a request for content, and so on can be advanced to the upcoming hub via one or more other car's Bluetooth® link so that when the car comes into the hub's WLAN range efficient communication is facilitated. Pre-fetching and/or sending back some or all of one car's requested content via the Bluetooth® link or links of another car or cars is also enabled.

As a more specific example, traffic flow information can be shared among cars and a fusion of speed/location/time information along with additional metadata can be used to determine overall traffic conditions to be viewed by the consumer or routed around with the GPS navigation system. A roadside unit can pass on traffic information from the cars with which it has connected to other roadside hubs or back to servers via WAN connections for additional traffic data processing and distribution.

Because each node is generally only aware of a subset of the total available data at any time, various mechanisms for filtering the data may be provided. For example, rather than simply sharing the latest speed on a given road segment as observed by a given node, the recent speeds as observed by other nodes that have traversed that segment are also shared, along with any other speed data available in the system (for example data received by this or any other node from a broadcast source such as MSN Direct). This may include data for the local road segments as well as data for adjacent or even remote road segments that has propagated through the system via other nodes.

A confidence factor may be assigned to each data point, corresponding to the number of other recent data points which confirm and/or support this sample. This confidence factor may be dynamically adjusted, e.g., as new information is learned and as the staleness of each data point increases. Data may be only communicated to consumers for viewing and routing optimization when the confidence factor is above a certain threshold. Note that unlike confidence factors calculated at a server before dissemination of traffic information, the confidence factor herein may instead (or additionally) be calculated dynamically and locally by each node based on the information it has available, generally according to the mechanisms described herein.

Data points may be compared to historical traffic information (e.g., stored locally), and used to adjust the confidence factor up or down. For example, if a recent data point contradicts historical statistical information, the system may require more data points to corroborate this report before communicating this information.

Data points may be compared to those on adjacent road segments, and used to adjust the confidence factor up or down. For example if a data point indicates congested traffic on a road segment adjacent to one where traffic is thought to be free-flowing, the confidence factor may be reduced. If an adjacent road segment data matches, the confidence factor may be increased.

Data points also may be compared to real-time data received from a central source, for example a radio broadcast like MSN Direct. The comparison may be used to adjust the confidence factor up or down.

Not only may speeds for each road segment be shared, but also the confidence factors and timestamps that detail when that data point was measured. Each node may then store and compute traffic conditions, using local smoothing and averaging, and weighting each sample using the staleness and confidence factor of that data point.

Data points take time to propagate across large expanses of a road network, but information on roads that are far away within a metropolitan area is useful for making navigating decisions. Therefore data may be continued to be propagated even as its staleness increases, up to a point where it is no longer relevant. For example, each node can employ local prediction techniques to estimate likely current traffic conditions, given what the traffic on a distant road segment was some time (e.g., fifteen minutes) ago and the trend at that time. Historical traffic data stored locally can be used as an input to this prediction algorithm as well.

As can be seen, enabling consumer vehicles to report traffic conditions, along with dissemination of this information in an anonymous, ad-hoc fashion, generates the volume of data that is adequate to accurately report traffic conditions in a cost-effective manner. Consumer GPS navigation systems allow for accurate self-positioning on the road network, and high powered Bluetooth® signals allow traffic information to flow among cars. This extends traffic information along roads that are not covered by traffic sensors today, and allows future car-to-car information flow.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a mobile communications environment, a method comprising:
    transmitting data from a short-range radio device in a mobile vehicle to an external receiver that is not physically connected to the mobile vehicle, including by boosting transmission power of the device to a maximum transmission power or substantially close to the maximum transmission power as allowed by governmental regulations at least while transmitting to the external receiver, wherein the boosting includes using at least one of additional circuitry associated with the device or an amplifier associated with the mobile vehicle, and wherein transmitting the data comprises:
advertising to establish a link with the external receiver;
broadcasting current data of the mobile vehicle associated with the short-range radio and any stored data received from other mobile vehicles; and
transitioning to a receive data mode.

2. The method of claim 1 wherein transmitting the data comprises placing the data in an unused pairing payload associated with the short-range radio device in the mobile vehicle.

3. The method of claim 1 further comprising waiting for a period before advertising, including computing a wait time based at least in part on an identifier corresponding to the device.

4. The method of claim 1 wherein the external receiver comprises another mobile vehicle, and further comprising, receiving one or more communications at the device from the other mobile vehicle.

5. The method of claim 4 wherein transmitting the data and receiving the one or more communications comprises exchanging traffic-related data.

6. The method of claim 1 wherein the external receiver comprises a roadside hub, and further comprising, receiving one or more communications at the device from the roadside hub.

7. The method of claim 1 wherein the device is a Bluetooth® device, and further comprising, using Bluetooth® communication in conjunction with wireless local area network (WLAN) technology to reduce WLAN connection setup time or reduce WLAN contention, or both to reduce WLAN connection setup time and reduce WLAN contention.

8. The method of claim 1 wherein the device is a Bluetooth® device, and wherein transmitting the data comprises adding information to a set of data corresponding to a Bluetooth® discovery mode.

9. The method of claim 1 further comprising, receiving an advertisement at the device, computing a wait time based at least in part on an identifier corresponding to the device, and if no other acknowledgement was accepted within the wait time, transmitting an acknowledgement in response to the advertisement.

10. In a mobile communications environment, a system comprising:
a mobile Bluetooth®-enabled device in a vehicle, the device configured to transmit data to at least one of another vehicle or a roadside hub at an increased output power level relative to recommended Bluetooth® power levels to allow long range radio communication links between the vehicle and the at least one of the other vehicle or the roadside hub, the increased output power level being a maximum transmission power or substantially close to the maximum transmission power as allowed by governmental regulations, wherein the device is configured to transmit the data at the increased output power level using at least one of additional circuitry associated with the device or an amplifier associated with the vehicle, the data including information that is useable in determining traffic conditions.

11. The system of claim 10 wherein the Bluetooth®-enabled device comprises a navigation device, and wherein the information that is useable in determining traffic conditions includes location, speed, and bearing data of the vehicle.

12. The system of claim 10 wherein the information that is useable in determining traffic conditions includes location, speed, and bearing data of another vehicle.

13. The system of claim 10 wherein the Bluetooth®-enabled device receives other information that is useable in determining traffic conditions, the Bluetooth®-enabled device further configured to determine a confidence level for the traffic conditions based on at least one part of the other information and using the other information and each confidence level to estimate current traffic conditions.

14. The system of claim 13 wherein the other information is received from at least one other vehicle or from at least one roadside hub, or is received from both at least one other vehicle and from at least one roadside hub.

15. The system of claim 10 wherein the Bluetooth®-enabled device receives information originating from an Internet source from at least one other vehicle or from at least one roadside hub, or from both at least one other vehicle and from at least one roadside hub.

16. In a mobile communications environment, a method executed at least in part on at least one processor, the method comprising:
transmitting first data from a Bluetooth® device in a mobile vehicle to an external receiver, the first data comprising Bluetooth® discovery data, and including information that is useable in determining traffic conditions within the Bluetooth® discovery data, the first data transmitted at a boosted power level using at least one of additional circuitry associated with the device or an amplifier associated with the mobile vehicle, wherein transmitting the first data comprises:
advertising to establish a link with the external receiver;
broadcasting current data of the mobile vehicle associated with the Bluetooth® device and any stored data received from other mobile vehicles;
transitioning to a receive data mode; and
receiving second data from at least one other Bluetooth® device that is not physically connected to the mobile vehicle, and using the first and second data to estimate upcoming traffic conditions.

17. The method of claim 16 wherein receiving the second data comprises receiving communications from at least one other vehicle or from at least one roadside hub, or receiving communications from both at least one other vehicle and from at least one roadside hub.

18. The method of claim 16 further comprising, receiving data originating from an Internet source via at least one other Bluetooth® device that is not physically connected to the mobile vehicle.

19. The method of claim 18, further comprising transmitting data to the Internet source via the at least one other Bluetooth® device that is not physically connected to the mobile vehicle.

20. The method of claim 16, wherein transmitting the data further comprises boosting the power of the transmission to a level substantially equivalent to a maximum power level allowed for Bluetooth® devices.

* * * * *